United States Patent Office 3,385,913
Patented May 28, 1968

1

3,385,913
THERMOSETTING COPOLYMERS BASED UPON PROPYLENE OXIDE-BUTADIENE MONOXIDE COPOLYMERS
Michael J. Skrypa, Camillus, N.Y., assignor to Allied Chemical Corporation, New York, N.Y., a corporation of New York
No Drawing. Filed Mar. 24, 1965, Ser. No. 442,532
8 Claims. (Cl. 260—898)

ABSTRACT OF THE DISCLOSURE

This invention relates to new thermoset cross-linked copolymers of a propylene oxide-butadiene monoxide copolymer cross-linked with either methyl-α-cyanoacrylate or vinylidene cyanide. The propylene oxide-butadiene monoxide copolymer employed contains 1 to 13 allylic groups, preferably 4 to 8 allylic groups, per 1000 grams of copolymer. The cross-linking agent is employed in a proportion of about 0.25 to 3 mols, preferably 0.9 to 3 mols, with an especially preferred range of 1.1 to 1.3 mols, per double bond in the copolymer. The cross-linked propylene oxide-butadiene monoxide copolymers of the present invention are advantageously employed as castings, laminates, surface coatings, and adhesive agents which are resistant to chipping, cracking, and atmospheric degradation even at elevated temperatures, and to processes for their preparation.

---

Heretofore, propylene oxide-butadiene monoxide copolymers have been prepared as thermoplastic materials which are either liquid, semi-solid or solid materials. As may readily be seen, liquid and semi-solid propylene oxide-butadiene monoxide copolymers are severely limited in the area of their industrial application and may be utilized as lubricating agents and the like. Solid propylene oxide-butadiene monoxide copolymers, on the other hand, possess minimum thermal stability and are readily susceptible to chipping and cracking under minimum load due to inherent brittleness and excessive rigidity.

An object of the present invention is to provide new thermoset copolymers derived from propylene oxidebutadiene monoxide copolymer by reaction with a compound selected from the group consisting of methyl-α-cyanoacrylate and vinylidene cyanide.

A further object is to provide processes for the preparation of these new thermoset copolymers. Other objects and advantages will become apparent from the following description.

In accordance with the present invention new thermoset copolymers may be prepared by admixing and reacting propylene oxide-butadiene monoxide copolymer with a compound selected from the group consisting of methyl-α-cyanoacrylate and vinylidene cyanide in the presence of a suitable organic peroxide. Propylene oxide butadiene monoxide copolymer when reacted with a compound selected from the group consisting of methyl-α-cyanoacrylate and vinylidene cyanide produces a thermoset copolymer possessing outstanding thermal stability, and tensile and flexural strength. Due to these particular chemical and physical properties, the thermoset propylene oxide-butadiene monoxide copolymers of the present invention may be advantageously employed as casting, potting, laminating, surface coating, and adhesive agents which are resistant to chipping, cracking and atmospheric degradation even at elevated temperatures.

The propylene oxide-butadiene monoxide copolymer utilized in the present invention, has the probable recurring unit of the formula:

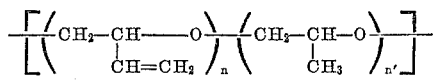

wherein $n$ and $n'$ are integers from about 1 to 20, and in successive recurring units $n$ and also $n'$ generally will have different values from one unit to the next. Moreover, these values of $n$ and $n'$ will be limited to allow only copolymers having molecular weights from about 150 to 2,000 and having between 1 to 13 inclusive allylic groups per 1000 grams. Copolymers having a molecular weight up to at least 1,500 are in the liquid state.

The molar ratio of propylene oxide to butadiene monoxide may vary over a wide range and the selection of any particular ratio is normally dictated by the properties desired in the resulting copolymer, i.e., the number of allylic linkages present. This molar ratio usually falls within the range of 3 to 1 mols propylene oxide per mol butadiene monoxide. Since, however, the butadiene monoxide reactant is of substantially lower reactivity than is the propylene oxide reactant, it is preferred to employ an excess of butadiene monoxide in order to incorporate a significant amount of this reactant in the resulting copolymer. Use of the above particular molar ratio range results in propylene oxide-butadiene monoxide copolymer which contains from about 4 to 8 allylic groups per 1000 grams of mass.

The molecular weight of the copolymer is controlled by the amount of initiator employed. Illustrative of suitable initiators are ethylene glycol, propylene glycol, glycerol and pentaerythritol. A mol of initiator is employed for every mol of polymer desired.

The reaction of propylene oxide and butadiene monoxide is generally carried out in the presence of a catalyst. Illustrative of suitable catalysts are: the alkali metal hydroxides such as potassium, sodium, and lithium hydroxides; organic amines such as ethylenediamine and ethanolamine; and fluoboric acid.

The amount of catalyst is not critical, however, and from about 0.25 to 1.0%, preferably 0.3 to 0.5%, based upon the total amount of the reactants is employed.

Reaction temperatures from about 75° C. to 125° C. and preferably 85° C. to 95° C. may be utilized. Since both propylene oxide and butadiene monoxide possess relatively low boiling points (35° C. to 67° C., respectively) the reaction is preferably carried out in a closed vessel. Autogenous pressures developed in the closed reaction vessel at the beginning of reaction range from about 30 to 60 p.s.i.g. Reaction times vary somewhat with the temperature employed but usually fall within the range of from about 15 to 100 hours and generally 24 to 65 hours.

Purification of the resulting propylene oxide-butadiene monoxide copolymer may be effected by utilizing conventional procedures. For example, the copolymer may be taken up in a suitable solvent such as n-hexane, heptane or propyl ether and washed with a dilute mineral acid such as hydrochloric, sulfuric or phosphoric acids. The resulting solution is then allowed to stand in order to effect gravitational separation of the organic phase from the aqueous phase, whereupon the aqueous phase is drawn off and discarded and the resulting organic phase water-washed in order to effect the removal of trace amounts of the neutralization agent and by-product salts. The purified copolymer may be then isolated by distilling off the solvent and any trace amount of water.

As previously indicated, reaction of propylene oxide-butadiene monoxide copolymers with methyl-α-cyanoacrylate and vinylidene cyanide is carried out in the presence of an organic peroxide. Suitable catalysts include dialkyl peroxides, alkyl hydroperoxides, peresters and ketone peroxides. Illustrative of such organic peroxides are di-t-butyl peroxide, di-cumyl-peroxide, t-butyl hydroperoxide, t-butyl perbenzoate, and methyl ethyl ketone peroxide. The amount of organic peroxide employed is not critical and normally falls within the range of from about 0.75 to 3.0% and preferably 1.0 to 1.5% based on the total amount of the reactants.

The propylene oxide-butadiene monoxide copolymer, as prepared by the process set forth above, is then reacted with methyl-α-cyanoacrylate or vinylidene cyanide in order to produce a thermoset copolymer having the previously enumerated physical and chemical properties.

Methyl-α-cyanoacrylate is a liquid which has a boiling point of 46° C./1.5 mm. and may be represented by the structural formula:

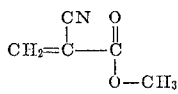

Methyl-α-cyanoacrylate may be prepared by condensing equimolar portions of methyl cyanoacetate and formaldehyde in a liquid phase alkali catalyzed reaction to produce the intermediate methylol compound. This intermediate is then dehydrated in an acetic anhydride solution by heating to a temperature between 160° and 240° C. to produce the desired methyl-α-cyanoacrylate.

Vinylidene cyanide is a liquid having a boiling point of about 47° C./2 mm. and possesses the structural formula:

Vinylidene cyanide may be prepared by condensing acetic anhydride with hydrogen cyanide in a liquid phase amine catalyzed reaction to produce the intermediate 1-acetoxy-1,1-dicyanoethane. This intermediate is then pyrolyzed at a temperature of about 500° to 600° C. to produce the desired vinylidene cyanide.

The amount of methyl-α-cyanoacrylate or vinylidene cyanide utilized in rendering the propylene oxide-butadiene monoxide copolymer to a thermoset condition is normally determined by the degree of unsaturation present in the copolymer which may readily be ascertained by employing conventional analytical analysis such as determination of the Iodine Number or Bromine Number (ASTM–D–1158). Upon determining the degree of unsaturation in terms of number of double bonds per 1000 grams, a molar ratio of from about 0.25 to 3 mols methyl-α-cyanoacrylate or vinylidene cyanide per double bond (as previously determined) are employed. For best results, it is preferred to employ a ratio of 0.9 to 3, preferably 1.1 to 1.3 mol methyl-α-cyanoacrylate or vinylidene cyanide per double bond contained in the copolymer.

The temperature at which methyl-α-cyanoacrylate and vinylidene cyanide and propylene oxide-butadiene monoxide copolymers are admixed is not critical and may vary over a range. Normal ambient room temperatures are quite satisfactory.

The curing temperature at which methyl-α-cyanoacrylate or vinylidene cyanide react with propylene oxide-butadiene monoxide copolymers to produce thermoset resins depends on the nature of the peroxide catalyst employed, the presence and concentration of activators such as cobalt naphthenate, the mass and shape of the reaction system, and the curing time desired. Generally speaking, curing temperatures vary from about 25° C. to about 150° C. with curing times ranging from about 1 hour to about 48 hours. Curing temperatures ranging from about 50° C. to about 125° C. with resultant curing times of about 1 hour to about 10 hours have been found suitable for production of small castings.

In preferred operation, propylene oxide-butadiene monoxide copolymer is admixed with methyl-α-cyanoacrylate or vinylidene cyanide or mixture thereof in a ratio of from about 1.18 mols per double bond contained in the copolymer molecule, 1 to 3% of a 4:1 mixture of methyl ethyl ketone peroxide and dicumyl peroxide, and 0.05% cobalt naphthenate and heated to a temperature within the range of 45 to 150° C. for a period of 1.5 to 3.0 hours.

The following examples are given for the purpose of illustrating the present invention.

Example 1.—Preparation of propylene oxide-butadiene monoxide copolymer

To a closed autoclave was charged 387 parts butadiene monoxide, 290 parts propylene oxide, 29.5 parts propylene glycol, and 2.8 parts potassium hydroxide. The resulting reaction mixture was heated to a temperature range of 85° to 95° C. for a period of 54 hours. At the end of this period, the pressure was 14″ Hg vacuum.

A yield of 650 parts propylene oxide-butadiene monoxide copolymer, corresponding to a yield of 91.7% of theory, was obtained. Crude propylene oxide-butadiene monoxide copolymer was taken up with an equal volume of n-hexane, one-half volume of water and concentrated HCl in an amount sufficient to neutralize the potassium hydroxide catalyst. The resulting mixture was vigorously agitated for 0.5 hour and allowed to stand to effect the gravitational separation of the two phases. The organic phase was water-washed six times in order to remove any trace amount of potassium hydroxide or by-product salt. n-Hexane and water were finally removed by vacuum distillation and 615 parts of purified propylene oxide-butadiene monoxide copolymer were recovered. The resulting copolymer was tested by standard iodine and mercuric acetate analysis for olefin content, the results of which showed about 7 double bonds per 1000 grams copolymer.

Example 2.—Reaction with methyl-α-cyanoacrylate

A propylene oxide-butadiene monoxide copolymer was prepared substantially in accordance with the procedure set forth in Example 1. The resulting copolymer has a molecular weight of 1040 and 8 double bonds per 1000 grams of copolymer. A reaction mixture was prepared comprised of 5 parts copolymer, 4.4 parts methyl-α-cyanoacrylate, 0.005 part cobalt naphthenate (as drying agent) and 0.25 part of a mixture of methyl ethyl ketone peroxide and dicumyl peroxide. The resulting reaction mixture was then placed in a 45° C. bath whereupon gelling was observed in 0.25 hour. After a period of about 0.5 hour, the reaction temperature increased to 80° C. by reason of exothermic heat. The reaction mixture was placed in a bath maintained at 120° C. which, in turn, was rapidly heated to 150° C. and maintained at this temperature for an additional 1.5 hours. The resulting methyl - α - cyanoacrylate - propylene oxide - butadiene monoxide copolymer was a hard solid having a hardness of 84 (Barcol) and was of a medium amber color.

Example 3.—Reaction with vinylidene cyanide

To a reaction vessel was charged 3.18 parts of the propylene oxide-butadiene monoxide copolymer utilized in Example 2, along with 2.0 parts vinylidene cyanide, 0.16 parts cobalt naphthenate (as drying agent) and 0.14 part of a mixture of methyl ethyl ketone peroxide and t-butyl perbenzoate. The reaction mixture was placed in an 80° C. bath whereupon the temperature of the reaction mixture increased by reason of exothermic heat. The reaction mixture was transferred to a water bath and the temperature of the mixture maintained within the range of about 140° C. to 150° C. and finally lowered to a temperature of 123° C. and maintained at this point for a period of 10 to 15 minutes. The reaction temperature was again increased to 150° C. and there maintained for one hour. The resulting vinylidene cyanide-propylene oxide-butadiene monoxide copolymer was a hard solid having a hardness of 50 to 75 (Barcol).

Closely related olefin compounds such as 1,2-dicyanoethylene, diethyl methyl malonate and diethyl maleate resulted in unsatisfactory compositions which were of a liquid or gel-like physical nature, and were unsuitable for use as laminates, coating agents, castings, and the like. Styrene, the monomer commonly used to produce thermoset resins from unsaturated polyesters made from maleic anhydride and ethylene or propylene glycol, produced equally unsatisfactory compositions.

It is to be understood that the foregoing is by way of illustration and that changes and modifications may be made within the scope of the appended claims without departing from the spirit of the invention.

I claim:
1. A solid thermoset resinous composition which is the reaction product of a propylene oxide-butadiene monoxide copolymer, having a molecular weight of from about 150 to 2000 and having between 1 to 13, inclusive, allylic groups per 1000 grams, with a compound selected from the group consisting of methyl-α-cyanoacrylate and vinylidene cyanide, said compound being present in a proportion from about 0.25 to 3 mols of said compound per double bond of said copolymer.

2. The resinous composition of claim 1 characterized by a Barcol hardness of at least 50.
3. The resinous composition of claim 1 wherein the compound is present in a proportion from about 0.9 to 3 mols per double bond of said copolymer.
4. The resinous composition of claim 1 wherein the compound is methyl-α-cyanoacrylate.
5. The resinous composition of claim 1 wherein the compound is vinylidene cyanide.
6. The resinous composition of claim 1, wherein the propylene oxide-butadiene monoxide copolymer has between 4 to 8 allylic groups per 1000 grams of copolymer.
7. The resinous composition of claim 1 wherein the compound is present in a proportion from about 1.1 to 1.3 mols per double bond of said copolymer.
8. The resinous composition of claim 1 wherein the copolymer has a molecular weight of about 750 to 1600.

References Cited
UNITED STATES PATENTS 3,031,439  4/1962  Bailey _____ 260—79.3
3,321,430  5/1967  Ott et al. _____ 260—876

FOREIGN PATENTS 1,324,542  4/1963  France.

MURRAY TILLMAN, *Primary Examiner.*

G. F. LESMES, *Examiner.*

J. T. GOOLKASIAN, *Assistant Examiner.*